United States Patent [19]

Benham et al.

[11] Patent Number: 5,378,764
[45] Date of Patent: Jan. 3, 1995

[54] POLYETHYLENE BLENDS

[75] Inventors: Elizabeth A. Benham; F. Wally Bailey; John D. Wehmeyer; Max P. McDaniel, all of Bartlesville, Okla.

[73] Assignee: Phillips Petroleum Company, Bartlesville, Okla.

[21] Appl. No.: 958,405

[22] Filed: Oct. 8, 1992

[51] Int. Cl.$^6$ .................... C08L 23/04; C08L 23/06
[52] U.S. Cl. .................................................. 525/240
[58] Field of Search ........................................ 525/240

[56] References Cited

U.S. PATENT DOCUMENTS

| | | | |
|---|---|---|---|
| 4,053,436 | 10/1977 | Hogan et al. | 252/452 |
| 4,205,021 | 5/1980 | Morita et al. | 526/348.6 |
| 4,219,444 | 8/1980 | Hill et al. | 252/435 |
| 4,345,055 | 8/1982 | Hawley | 526/96 |
| 4,410,649 | 10/1983 | Cieloszyk | 524/108 |
| 4,425,268 | 1/1984 | Cooper | 524/110 |
| 4,436,788 | 3/1984 | Cooper | 428/483 |
| 4,457,960 | 7/1984 | Newsome | 428/35 |
| 4,504,434 | 3/1985 | Cooper | 264/22 |
| 4,587,303 | 5/1986 | Turtle | 525/240 |
| 4,597,920 | 7/1986 | Golike | 525/240 |
| 4,614,764 | 9/1986 | Colombo et al. | 525/72 |
| 4,617,241 | 10/1986 | Mueller | 428/520 |
| 4,623,567 | 11/1986 | Hert | 525/240 |
| 4,623,581 | 11/1986 | Hert | 525/240 |
| 4,705,829 | 11/1987 | Kwack et al. | 525/240 |
| 4,734,327 | 3/1988 | Vicik | 428/332 |
| 4,760,116 | 7/1988 | Roberts | 525/221 |
| 4,774,277 | 9/1988 | Janac | 524/474 |
| 4,957,974 | 9/1990 | Ilenda et al. | 525/301 |
| 4,981,760 | 1/1991 | Naito et al. | 428/523 |
| 5,006,398 | 4/1991 | Banerji | 428/220 |
| 5,073,598 | 12/1991 | Anzini | 525/193 |
| 5,112,674 | 5/1992 | German et al. | 428/216 |

FOREIGN PATENT DOCUMENTS

| | | |
|---|---|---|
| 70220 | 1/1983 | European Pat. Off. |
| 53-125452 | 11/1978 | Japan. |
| 59-149941 | 8/1984 | Japan. |
| 62-010150 | 1/1987 | Japan. |

Primary Examiner—Carman J. Seccuro, Jr.
Attorney, Agent, or Firm—Carl D. Corvin

[57] ABSTRACT

A polyethylene composition comprising: (a) about 1 to about 30 weight percent of a branched polyethylene resin, wherein said resin is produced by the high pressure, free radical, polymerization process, and wherein said resin has a density from about 0.91 to about 0.93 grams per cubic centimeter, and wherein said resin has a melt index less than 6 grams per 10 minutes; and (b) about 99 to about 70 weight percent of a linear polyethylene resin, wherein said resin is produced by the low pressure, transition metal, polymerization process, and wherein said resin has a density from about 0.91 to about 0.94 grams per cubic centimeter, and wherein said resin has a melt index less than about 1 gram per 10 minutes, and wherein said resin has a shear ratio greater than about 50, and wherein said resin has a heterogeneity index greater than 6; wherein said weight percents are based on the weight of said polyethylene composition.

27 Claims, No Drawings

POLYETHYLENE BLENDS

BACKGROUND OF THE INVENTION

This invention relates to the field of polyethylene blends.

Polyethylene is known as a general purpose thermoplastic. Billions of pounds of polyethylene are produced each year. Polyethylene is produced in two main processes. The first process is the high pressure, free radical, polymerization process. The second process is the low pressure, transition metal, polymerization process.

The high pressure, free radical, polymerization process produces a polyethylene resin that has, in general, low haze values and moderate strength values when used in film applications. This type of polyethylene resin tends to have several short and long chain branches, hence the reason it is recognized in the art as "branched polyethylene" or "low density polyethylene".

The low pressure, transition metal, polymerization process produces a polyethylene resin that has, in general, high haze values and high strength values when used in film applications. This type of polyethylene resin tends to have a few short chain branches and essentially no long chain branches, hence the reason it is recognized in the art as "linear polyethylene" or "linear low density polyethylene".

It is desirable for a polyethylene film to possess high impact strength, high tear strength, and low haze. This is because a polyethylene film with better properties could use less polyethylene resin to accomplish a given task. For example, a polyethylene grocery sack that used less polyethylene resin because it has better properties is more environmentally friendly than a polyethylene grocery sack that uses more polyethylene resin because its properties are not as good.

High impact strength is desirable because a polyethylene film with high impact strength will be able to resist rupturing better than a polyethylene film with low impact strength, other factors being equal. High impact strength is especially desirable in polyethylene grocery sacks where higher impact strength could lead to a sack that uses less polyethylene resin.

High tear resistance is also desirable because a polyethylene film with high tear strength will then be able to resist tearing better than a polyethylene film with low tear strength, other factors being equal. High tear strength is also especially desirable in polyethylene grocery sacks where a tear could lead to the catastrophic failure of the sack.

Low haze is desirable because a polyethylene film with haze will be easier to see through than a polyethylene film with high haze. Low haze is especially desirable in applications like bread packaging where a consumer wishes to look at the product before buying the product.

It is difficult however, to produce a polyethylene film that has high impact strength, high tear strength, and low haze. This is because there are several competing factors that affect these properties. For example, increasing the density of a polyethylene resin increases the tear strength of the resin (which is desirable) but it also increases the haze of the resin (which is not desirable) and it also decreases the impact strength of the resin (which is not desirable) other factors being equal.

As another example, increasing the molecular weight of a polyethylene resin increases both the tear strength and the impact strength of the resin (which is desirable) but is also increases the haze of the resin (which is not desirable) other factors being equal.

As another example, broadening the molecular weight distribution (as hereafter defined) of a polyethylene resin increases the processability of the resin (which is desirable) but it also decreases the impact strength of the resin (which is not desirable) and increases the haze of the resin (which is not desirable) other factors being equal. Easy processability is desired because it allows a polyethylene producer to process more polyethylene resin through his polyethylene equipment without degrading the resin, other factors being equal.

This invention presents an improved polyethylene composition having a desirable combination of properties.

SUMMARY OF THE INVENTION

It is an object of this invention to provide an improved polyethylene composition.

It is another object of this invention to provide a polyethylene composition with improved tear strength.

It is still another object of this invention to provide a polyethylene composition with improved tear strength and improved haze.

In accordance with this invention a polyethylene composition having both improved tear strength and improved haze is provided. This polyethylene composition comprises (or optionally consists essentially of, or consists of): (1) from about 1 to about 30 weight percent of a branched polyethylene resin, wherein said resin is produced by the high pressure, free radical, polymerization process, and wherein said resin has a density from about 0.91 to about 0.93 grams per cubic centimeter, and wherein said resin has a melt index less than 6 grams per 10 minutes; and (2) from about 99 to about 70 weight percent of a linear polyethylene resin, wherein said resin is produced by the low pressure, transition metal, polymerization process, and wherein said resin has a density from about 0.91 to about 0.94 grams per cubic centimeter, and wherein said resin has a melt index less than about 1 gram per ten minutes, and wherein said resin has a shear ratio greater than about 50, and wherein said resin has a heterogeneity index greater than 6; wherein said weight percents are based on the weight of said polyethylene composition.

DETAILED DESCRIPTION OF THE INVENTION

The polyethylene composition of this invention, in general, comprises a blend of a branched polyethylene resin and a linear polyethylene resin.

The branched polyethylene resin is prepared by the high pressure, free radical, polymerization process. This process is known in the art. For example, it uses oxygen, peroxides, and/or other strong oxidizers as a catalyst. Typical pressures are from about 100 to about 350 MPa and typical temperatures are from about 130° C. to about 350° C. This process produces polyethylene resins that are highly branched with short side chains occurring about every 15 to 40 carbon atoms in the chain backbone, hence the art given name of "branched polyethylene." Examples of high pressure, free radical, polymerization processes can be found in U.S. Pat. Nos. 2,953,551; 2,979,496; 3,293,233; 3,350,372; 3,628,918; 3,725,378; 3,780,140; 3,842,060; 4,135,044; the entire disclosures of which are hereby incorporated by reference.

The amount of branched polyethylene resin used in the polyethylene composition is from about 1 to about 30 weight percent wherein the weight percent is based on the weight of the polyethylene composition. However, it is preferred that the amount us ed be from about 2.5 to about 27.5 weight percent; it is more preferred that the amount used be from about 5 to about 25 weight percent; and it is most preferred that the amount used be from 7.25 to 22.5 weight percent. These different ranges are preferred for a variety of reasons. For example, environmental regulations, safety concerns, economic limitations or advantages, desired polymer properties, and desired production quantities, all play a part in determining the appropriate range to use.

The branched polyethylene resin should have a density from about 0.91 to about 0.93 grams per cubic centimeter. However, it is preferred that the density be from about 0.913 to about 0.93 grams per cubic centimeter; it is more preferred that the density be from about 0.916 to about 0.93 grams per cubic centimeter; and it is most preferred that the density be greater than 0.918 but less than 0.93 grams per cubic centimeter. These different ranges are preferred for a variety of reasons. For example, environmental regulations, safety concerns, economic limitations or advantages, desired polymer properties, and desired production quantities, all play a part in determining the appropriate range to use. The density can be determined using ASTM-D-1505.

The branched polyethylene resin should have a melt index less than 6 grams per 10 minutes, as measured by ASTM-D-1238 at 190° C. and with a 2.16 kg weight. However, it is preferred that the melt index be from about 0.001 to about 5 grams per 10 minutes; it is more preferred that the melt index be from about 0.01 to about 4 grams per 10 minutes; and it is most preferred that the melt index be from 0.1 to 3 grams per 10 minutes. These different ranges are preferred for a variety of reasons. For example, environmental regulations, safety concerns, economic limitations or advantages, desired polymer properties, and desired production quantities, all play a part in determining the appropriate range to use.

The linear polyethylene resin is prepared by the low pressure, transition metal, polymerization process. The polyethylene resin produced by this process is more linear in nature, that is, it has little or no long chain branching. Examples of low pressure, transition metal, polymerization processes can be found in U.S. Pat. Nos. 2,692,257; 2,825,721; 3,152,872; 3,172,737; 3,203,766; 3,226,205; 3,242,150; 3,248,179; 3,374,211; 3,622,521, 3,622,522; 3,644,325; 3,878,124; 3,922,322; 3,947,433; 3,954,909; 3,957,448; 3,971,768; 3,998,995; 4,003,712; 4,011,382; 4,039,472; 4,067,822; 4,086,408; 4,104,199; 4,105,842; 4,105,846; 4,121,029; 4,129,701; 4,209,603; 4,255,542; 4,260,709; 4,302,565; 4,302,566; the entire disclosures of which are hereby incorporated by reference.

It is preferred, however, that the transition metal be chromium. It is also preferred that the polymerization system be a slurry form polymerization system (also known as particle form polymerization). Examples of preferred chromium catalysts and/or slurry polymerization processes can be found in U.S. Pat. Nos. 3,887,494; 3,900,457; 3,947,433; 4,053,436; 4,081,407; 4,151,122; 4,294,724; 4,296,001; 4,345,055; 4,364,839; 4,364,841; 4,364,842; 4,364,854; 4,364,855; 4,392,990; 4,397,765; 4,402,864; 4,405,501; the entire disclosures of which are hereby incorporated by reference.

The amount of linear polyethylene resin used in the polyethylene composition is from about 99 to about 70 weight percent wherein the weight percent is based on the weight of the polyethylene blend composition. However, it is preferred that the amount used be from about 97.5 to about 72.5 weight percent; it is more preferred that the amount used be from about 95 to about 75 weight percent; and it is most preferred that the amount used be from 92.5 to 77.5 weight percent. These different ranges are preferred for a variety of reasons. For example, environmental regulations, safety concerns, economic limitations or advantages, desired polymer properties, and desired production quantities, all play a part in determining the appropriate range to use.

The linear polyethylene resin should have a density from about 0.91 to about 0.94 grams per cubic centimeter. However, it is preferred that the density be from about 0.913 to about 0.937 grams per cubic centimeter; it is more preferred that the density be from about 0.916 to about 0.933 grams per cubic centimeter; and it is most preferred that the density be from 0.92 to 0.93 grams per cubic centimeter. These different ranges are preferred for a variety of reasons. For example, environmental regulation, safety concerns, economic limitations or advantages, desired polymer properties, and desired production quantities, all play a part in determining the appropriate range to use. The density can be determined using ASTM-D-1505.

The linear polyethylene resin should have a melt index less than 1.0 grams per 10 minutes, as measured by ASTM-D-1238 at 190° C. and with a 2.16 kg weight. However, it is preferred that the melt index be from about 0.001 to about 0.8 grams per 10 minutes; it is more preferred that the melt index be from about 0.01 to about 0.6 grams per 10 minutes; and it is most preferred that the melt index be from 0.1 to 0.4 grams per 10 minutes. These different ranges are preferred for a variety of reasons. For example, environmental regulations, safety concerns, economic limitations or advantages, desired polymer properties, and desired production quantities, all play a part in determining the appropriate range to use.

The shear ratio is defined for the purposes of this specification as the ratio of the high load melt index, as determined by ASTM-D-1238 at a temperature of 190° C. with a 21.60 kg weight, to the melt index, as determined by ASTM-D-1238 at a temperature of 190° C. with a 2.16 kg weight. The linear polyethylene resin should have a shear ratio greater than 50. However, it is preferred that the shear ratio be from about 60 to about 150; it is more preferred, however, that the shear ratio be from about 70 to about 135; and it is most preferred that the shear ratio be from 80 to 120. These different ranges are preferred for a variety of reasons. For example, environmental regulations, safety concerns, economic limitations or advantages, desired polymer properties, and desired production quantities, all play a part in determining the appropriate range to use.

The heterogeneity index is defined for the purposes of this specification as the ratio of the weight average molecular weight to the number average molecular weight, wherein both molecular weights are determined by using data collected from gel permeation chromatography. The gel permeation chromatography used in this specification was accomplished with a Waters 150C chromatograph operated at 140° C. with 1,2,4 trichlorobenzene used as the carrier solvent. The linear polyethylene resin should have a heterogeneity index greater than 6. However, it is more preferred that the heterogeneity index be from about 10 to about 40; it is more preferred that the heterogeneity index be from about 12 to about 32; and it is most preferred that the heterogeneity index be from 15 to 25. These different ranges are preferred for a variety of reasons. For example, environmental regulations, safety concerns, economic limitations or advantages, desired polymer properties, and desired production quantities, all play a part in determining the appropriate range to use.

The blending of the branched polyethylene resin and the linear polyethylene resin can be accomplished by any method known in the art which produces a blend from two polymer resins. Standard polymer processing equipment cam be used to make these blends such as, for example, single-screw extruders, twin-screw extruders, and continuous mixers. Additionally, during blending (or optionally during making the polymer) other components can be added to the blend. These components can be antioxidants, UV stabilizers, preservatives, processing aids, fluoroelastomers, slip agents, antiblocking agents, antistatic agents, pigments, flame retardants, crosslinking adjuvants, and blowing agents.

EXAMPLE

This example is provided to illustrate the invention. The particular reactants, conditions, properties, and the like, are intended to be generally illustrative of this invention and are not meant to be construed as unduly limiting the reasonable scope of this invention.

The branched polyethylene resin used in this example was acquired from the U.S. Industrial Chemicals Company. This branched polyethylene resin was produced using the high pressure, free radical, polymerization process. The linear resin used in this example was from the Daelim Corporation. It was produced using the low pressure, chromium catalyst, polymerization process.

These two resins were blown into 1 mil films and tested for their properties. All films used in this example were produced with a two inch Sano die. Line conditions were a 4:1 blow-up ratio, a 220° C.–240° C. die temperature, a take up speed of 30–70 ft/min., and a 14" frost line.

TABLE E1

| Selected Properties of the Branched and Linear Polyethylene Resin | | |
|---|---|---|
| Characteristic | Branched | Linear |
| Dart Drop[1] | 163 | 330 |
| Tear, MD[2] | 124 | 98 |
| Tear, TD[2] | 204 | 690 |
| Melt Index[3] | 2.6 | — |
| High Load Melt Index[3] | — | 17.4 |
| Density[4] | 0.921 | 0.929 |
| Haze[5] | 10 | 55 |

[1]The dart drop impact was determined in accordance with ASTM-D-1709. This is a standard test method for determining the impact resistance of polyethylene film. This is reported in grams.
[2]The tear resistance was determined in accordance with ASTM-D-1922. This is a standard test method for determining the propagation tear resistance of a plastic film. "MD" means machine direction, "TD" means transverse direction. This is reported in grams.
[3]The melt index and the high load melt index were determined in accordance with ASTM-D-1238. The melt index was determined at FR-190/2.16 and the high load melt index was determined at FR-190/21.60. This is reported in grams per 10 minutes.
[4]The density was determined in accordance with ASTM-D-1505. This is reported in grams per cubic centimeter.
[5]The haze was determined by using a Gardner XL-211 hazeguard/hazemeter system. This device uses a procedure similar to ASTM-D-1003.
"—" means not determined.

As can be seen from Table E1, the linear resin has a much better dart drop value, a much better tear TD value, but a lower tear MD value, and a higher haze value.

These above resins were then blended and selected properties were determined. The results are presented in Table E2.

TABLE E2

| | Selected Properties of the Blended Polyethylene Resins | |
|---|---|---|
| | Weight Percents | |
| Characteristic | Linear 90% Branch 10% | Linear 80% Branch 20% |
| Dart Drop[1] | 270 | 175 |
| Tear MD[2] | 130 | 120 |
| Tear TD[2] | 740 | 650 |
| Haze[3] | 31 | 18 |

[1]See Note 1, Table E1.
[2]See Note 2, Table E1.
[3]See Note 5, Table E1.

Comparing Table E2 to E1 the values for the tear resistance and the haze were greatly improved. However, this was not without a price because the dart drop was reduced.

Using the rule of mixtures the tear MD should have been close to 101 grams for the 90-10 mixture. Therefore, the actual value of 130 represents a twenty-nine percent improvement over the expected value. Similarly the tear TD should have been close to 641 grams. Therefore, the actual value of 740 represents a fifteen percent improvement over the expected value. Also, the haze value should have been close to fifty-one percent. Therefore, the actual value of 31 percent represents a 65 percent improvement over the expected value.

Similarly, the tear MD should have been close to 103 for the 80-20 mixture. Therefore, the actual value of 120 grams represents a seventeen percent improvement over the expected value. Similarly, the tear TD should have been close to 593 grams. Therefore, the actual value of 650 grams represents a ten percent improvement over the expected result. Also, the haze should have been close to 46 percent. Therefore, the actual value of 18 percent represents a 61 percent improvement over the expected value.

However, a cost was also observed. The dart drop of the 90-10 mixture should have been close to 313 grams. Therefore, the actual value of 270 grams represents a fourteen percent reduction in the expected value. Similarly, for the 80-20 mixture the dart drop should have been 297 grams. Therefore, the actual value of 173 grams represents a forty-two percent reduction in the expected value.

That which is claimed is:
1. A polyethylene composition comprising:
   (a) about 1 to about 30 weight percent of a branched polyethylene resin, wherein said resin is produced by the high pressure, free radical, polymerization process, and wherein said resin has a density from about 0.91 to about 0.93 grams per cubic centimeter, and wherein said resin has a melt index less than 6 grams per 10 minutes; and
   (b) about 99 to about 70 weight percent of a linear polyethylene resin, wherein said resin is produced by the low pressure, chromium catalyzed, polymerization process, and wherein said resin has a density from about 0.91 to about 0.937 grams per cubic centimeter, and wherein said resin has a melt index from about 0.001 to 0.4 grams per 10 minutes, and wherein said resin has a heterogeneity index greater than 15;

wherein said weight percents are based on the total weight of said polyethylene composition.

2. A composition according to claim 1 wherein the amount of said branched polyethylene resin is from about 2.5 to about 27.5 weight percent.

3. A composition according to claim 1 wherein the amount of said branched polyethylene resin is from about 5 to about 25 weight percent.

4. A composition according to claim 1 wherein the amount of said branched polyethylene resin is from 7.5 to 22.5 weight percent.

5. A composition according to claim 1 wherein said branched polyethylene resin has a density from about 0.913 to about 0.93 grams per cubic centimeter.

6. A composition according to claim 1 wherein said branched polyethylene resin has a density from about 0.916 to about 0.93 grams per cubic centimeter.

7. A composition according to claim 1 wherein said branched polyethylene resin has a density greater than 0.918 but less than 0.93 grams per cubic centimeter.

8. A composition according to claim 1 wherein said branched polyethylene resin has a melt index from about 0.001 to about 5 grams per 10 minutes.

9. A composition according to claim 1 wherein said branched polyethylene resin has a melt index from about 0.01 to about 4 grams per 10 minutes.

10. A composition according to claim 1 wherein said branched polyethylene resin has a melt index from 0.1 to 3 grams per 10 minutes.

11. A composition according to claim 1 wherein said low pressure, chromium catalyzed, polymerization process is a slurry form polymerization process.

12. A composition according to claim 1 wherein the amount of said linear polyethylene resin is from about 97.5 to about 72.5 weight percent.

13. A composition according to claim 1 wherein the amount of said linear polyethylene resin is from about 95 to about 75 weight percent.

14. A composition according to claim 1 wherein the amount of said linear polyethylene resin is from 92.5 to 77.5 weight percent.

15. A composition according to claim 1 wherein said linear polyethylene resin has a density from about 0.913 to about 0.937 grams per cubic centimeter.

16. A composition according to claim 1 wherein said linear polyethylene resin has a density from about 0.916 to about 0.933 grams per cubic centimeter.

17. A composition according to claim 1 wherein said linear polyethylene resin has a density from 0.92 to 0.93 grams per cubic centimeter.

18. A composition according to claim 1 wherein said linear polyethylene resin has a melt index from 0.1 to 0.4 grams per 10 minutes.

19. A composition according to claim 1 wherein said linear polyethylene resin has a shear ratio from about 60 to about 150.

20. A composition according to claim 1 wherein said linear polyethylene resin has a shear ratio from about 70 to about 135.

21. A composition according to claim 1 wherein said linear polyethylene resin has a shear ratio from 80 to 120.

22. A composition according to claim 1 wherein said linear polyethylene resin has a heterogeneity index from greater than 15 to 25.

23. A polyethylene composition comprising:
   (a) 7.5 to 22.5 weight percent of a branched polyethylene resin, wherein said resin is produced by the high pressure, free radical, polymerization process, and wherein said resin has a density greater than 0.918 but less than 0.93 grams per cubic centimeter, and wherein said resin has a melt index from 0.1 to 3 grams per 10 minutes; and
   (b) 92.5 to 77.5 weight percent of a linear polyethylene resin, wherein said resin is produced by the low pressure, chromium catalyzed, polymerization process, and wherein said resin has a density from 0.92 to 0.93 grams per cubic centimeter, and wherein said resin has a melt index from 0.1 to 0.4 grams per 10 minutes, and wherein said resin has a heterogeneity index from 15 to 25;

wherein said weight percents are based on the total weight of said polyethylene composition.

24. A polyethylene composition comprising:
   (a) about 1 to about 30 weight percent of a branched polyethylene resin, wherein said resin is produced by the high pressure, free radical, polymerization process, and wherein said resin has a density from about 0.91 to about 0.93 grams per cubic centimeter, and wherein said resin has a melt index less than 6 grams per 10 minutes; and
   (b) about 99 to about 70 weight percent of a linear polyethylene resin, wherein said resin is produced by the low pressure, chromium catalyzed, polymerization process, and wherein said resin has a density from about 0.91 to 0.93 grams per cubic centimeter, and wherein said resin has a melt index from about 0.001 to 0.4 grams per 10 minutes, and wherein said resin has a heterogeneity index greater than 15;

wherein said weight percents are based on the total weight of said polyethylene composition.

25. A composition according to claim 24 wherein said linear polyethylene resin has a density from 0.92 to 0.93 grams per cubic centimeter.

26. A composition according to claim 24 wherein said linear polyethylene resin has a melt index from 0.1 to 0.4 grams per 10 minutes.

27. A composition according to claim 24 wherein said linear polyethylene resin has a heterogeneity index from 15 to about 40.

* * * * *